W. AHRENS.
ANTIFRICTION BEARING.
APPLICATION FILED FEB. 28, 1910.
1,131,649.
Patented Mar. 16, 1915.
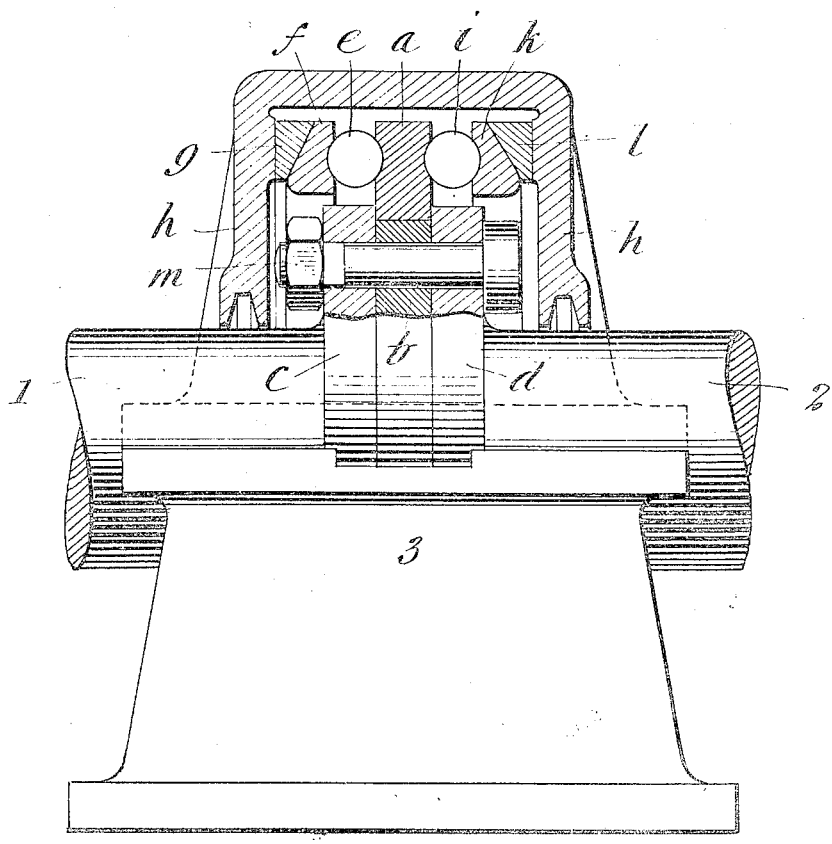

UNITED STATES PATENT OFFICE.

WERNER AHRENS, OF BERLIN, GERMANY.

ANTIFRICTION-BEARING.

1,131,649.  Specification of Letters Patent.  Patented Mar. 16, 1915.

Application filed February 28, 1910. Serial No. 546,355.

*To all whom it may concern:*

Be it known that I, WERNER AHRENS, a subject of the Emperor of Germany, residing at Berlin, Germany, have invented certain new and useful Improvements in Antifriction-Bearings, of which the following is a specification, reference being had therein to the accompanying drawing.

My invention relates to anti-friction bearings, and more particularly to that class thereof employed in connection with a shaft which is first constructed in two distinct sections and then secured together. For instance, thrust bearings are frequently employed in connection with very long shafts, such as those used for the propulsion of ships, power transmission, and the like, and it is desirable that provision be made so that the bearing or members thereof can be altered or renewed without dismounting the shaft.

My invention meets the requirements of such constructions and involves the normal separation of the shaft sections to an extent sufficient to permit the passage of the various parts between them. Preferably, I employ an interposed element between the two shaft sections which is firmly fastened in position, but obviously many changes and variations may be made in the construction without departing from the spirit of the invention. I have shown as my preferred form a construction wherein a thrust bearing is employed in connection with the two-part shaft, but it will be apparent that radial bearings might be similarly mounted and used; and generally speaking, I desire to be understood that I do not limit myself to any specific form or details except in so far as such limitations are specified in the claims.

The accompanying drawing is an elevation, partly in section, of a thrust journal box and its contained parts, embodying the principles of my invention.

The shaft is made in two sections 1 and 2 formed with end flanges $c$ and $d$ in the customary manner, and when secured to each other, the two sections constitute a single, continuous and firm shaft, as well known in the art. The flanges $c$ and $d$ are contained within the thrust box 3, which is provided with side walls or abutments $h$, $h$, against which the anti-friction devices bear. The thrust box 3 is made in sections, as indicated by dotted lines, and secured together in any desired manner, this construction permitting the separation of the sections to allow the manipulation of the various contained elements now to be described. As shown in my preferred form, a double acting thrust bearing is employed, comprising the inner plate $a$, the outer plates $f$ and $k$, and two series of interposed balls $e$ and $i$. Between the outer plates $f$ and $k$ and the side abutments $h$, $h$, are located, respectively, the filling-in or counter-plates $g$ and $l$, through which the pressure is transmitted to the thrust box 3. It will be noted that the end flanges $c$ and $d$ of the shaft sections are separated to a considerable extent, and that interposed between them are the disk $b$ and the inner thrust plate $a$, the said parts being firmly secured together in any suitable manner, as for instance by bolts $m$. When, for any reason, it becomes necessary to replace or renew the elements of the anti-friction bearing, this may be simply effected by merely loosening the bolts $m$ and removing the disk $b$ and plate $a$ from their positions between the flanges $c$ and $d$, which leaves a sufficient space to permit the introduction therebetween of the several elements of the bearing, and this, obviously, without discounting or otherwise affecting the positions and relation of the shaft sections.

As previously stated, the device illustrated is simply one exemplification of the embodiment of my invention, and many changes and variations therein will suggest themselves to those skilled in the art.

Having thus described my invention, its construction and mode of operation, what I claim and desire to secure by Letters Patent of the United States is as follows:

1. The combination of an anti-friction bearing, thrust abutments therefor, and a shaft constructed in two sections and detachably secured together between the abutments, the two sections being held together in fixed relations at a sufficient distance apart to permit the passage of the elements of the anti-friction bearing between them and without dismounting the shaft sections.

2. The combination of an anti-friction bearing, thrust abutments therefor, and a shaft constructed in two sections and detachably secured together between the abutments, the two sections being located at a sufficient distance apart to permit the passage of the elements of the anti-friction bearing between them and without dismounting the shaft sections, together with an interposed member to fill the space between the shaft sections.

3. The combination of an anti-friction bearing, with a shaft constructed in two sections and detachably secured together, the two sections being located at a sufficient distance apart to permit the passage of the elements of the anti-friction bearing between them and without dismounting the shaft sections, one of the members of the anti-friction bearing being interposed between the shaft sections and filling the space therebetween.

4. The combination of a shaft constructed in two sections, an antifriction bearing including a thrust member, which member is mounted removably between said sections, and means for connecting said sections and thrust member detachably together in fixed relations; whereby by the removal of said thrust member, the other parts of the bearing may be removed without demounting the shaft sections.

In testimony whereof I have affixed my signature in presence of two witnesses.

WERNER AHRENS.

Witnesses:
HENRY HASPER,
WOLDEMAR HAUPT.